Feb. 9, 1954
J. E. CHAMBERS
2,668,527
BROILER REFLECTOR SHIELD
Filed Oct. 18, 1948
2 Sheets-Sheet 1
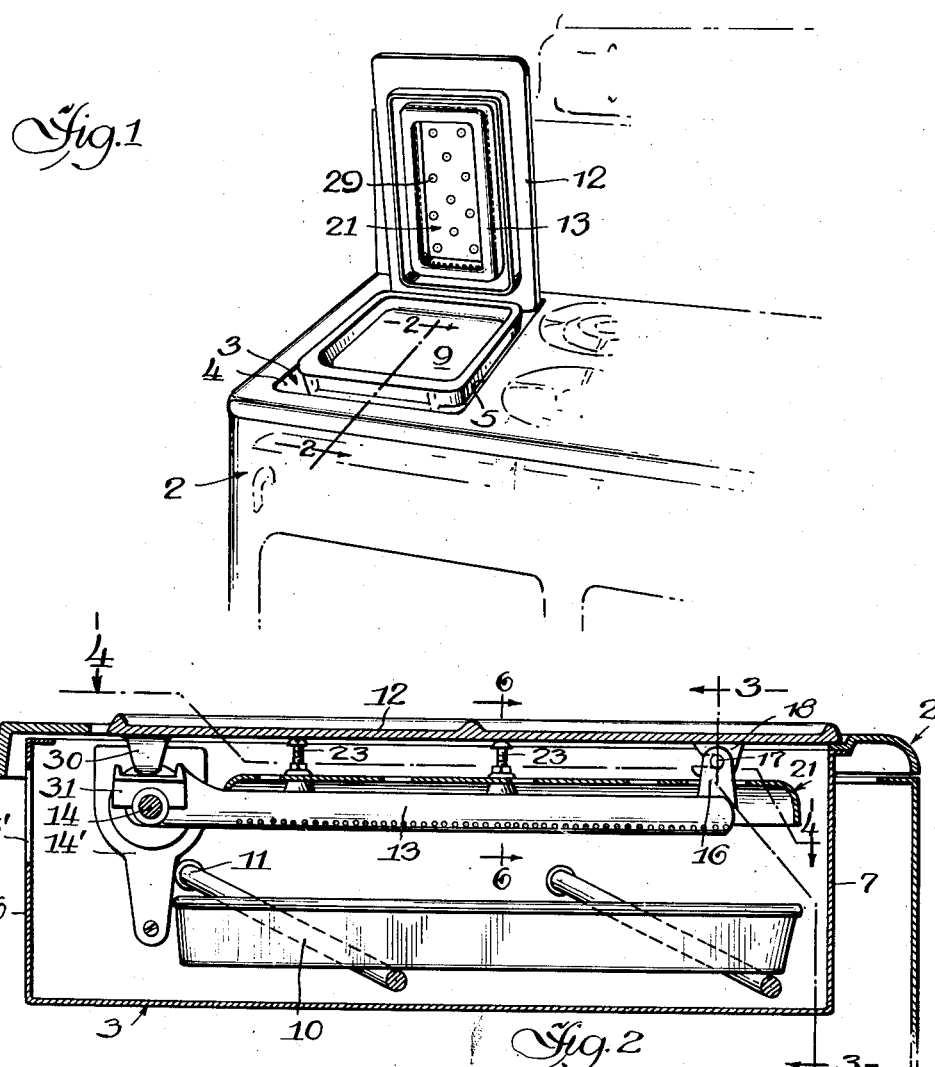
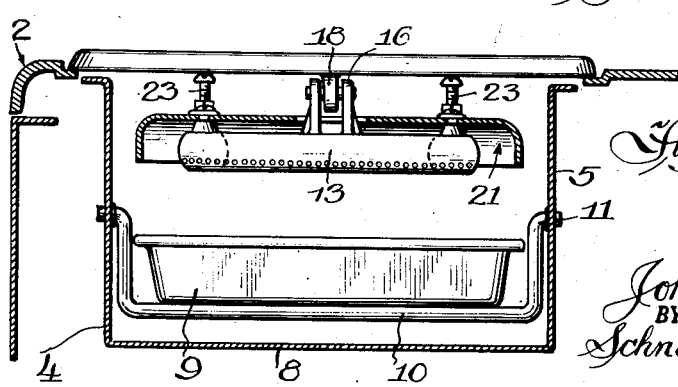
INVENTOR.
John E. Chambers.
BY
Schneider & Dressler
Attys.

Feb. 9, 1954    J. E. CHAMBERS    2,668,527
BROILER REFLECTOR SHIELD
Filed Oct. 18, 1948    2 Sheets-Sheet 2
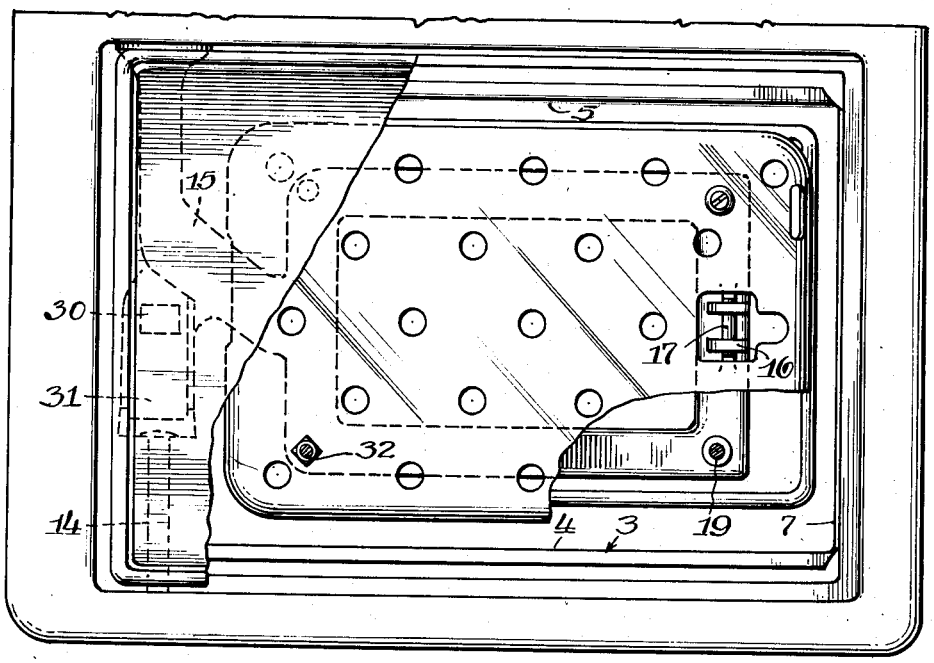
Fig. 4
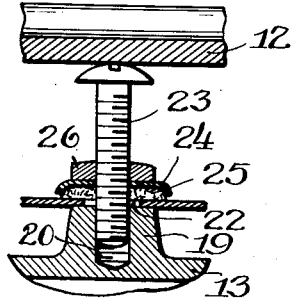
Fig. 6
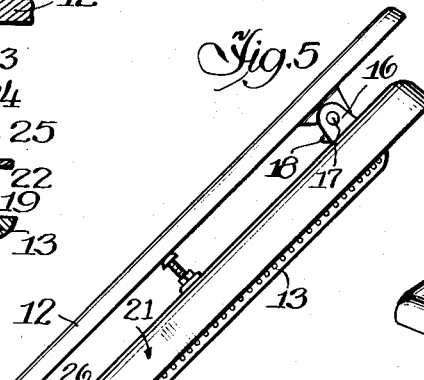
Fig. 5
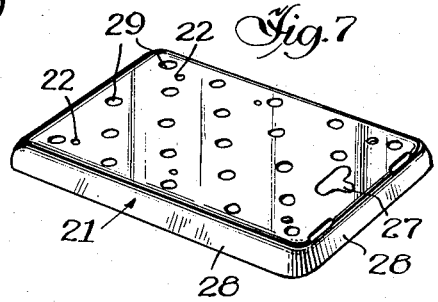
Fig. 7
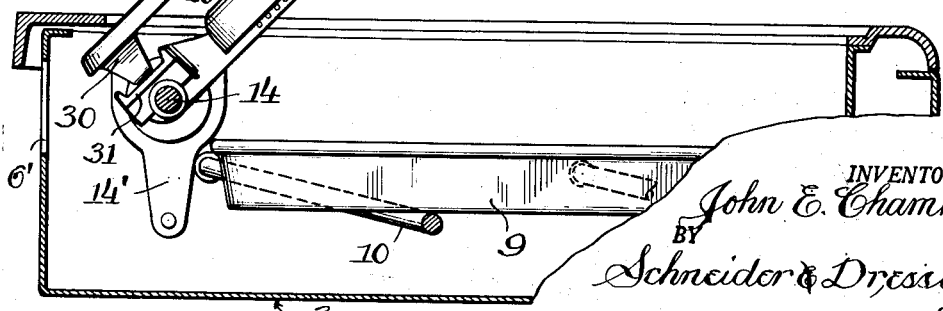
INVENTOR.
John E. Chambers.
BY
Schneider & Dresler,
Attys Patented Feb. 9, 1954

2,668,527

UNITED STATES PATENT OFFICE 2,668,527

BROILER REFLECTOR SHIELD

John E. Chambers, Shelbyville, Ind., assignor to Chambers Corporation, a corporation of Indiana Application October 18, 1948, Serial No. 55,093

2 Claims. (Cl. 126—39)

This invention relates to a reflector shield for a burner used with a combination broiler and griddle.

In gas ranges embodying a combination broiler and griddle, such as is disclosed in my prior Patent No. 2,011,848, it has been found that a burner of sufficient capacity to properly heat the broiler will furnish too much heat for the griddle when the burner is adjusted for proper heating of the broiler. For this reason it is difficult to use the broiler and the griddle simultaneously with completely satisfactory results.

In accordance with the present invention satisfactory simultaneous use of the broiler and griddle is made possible by means of a reflector shield which is secured to the burner in a position directly above the burner, about half way between the burner and griddle. The reflector shield directs most of the heat from the burner downwardly towards the broiler and at the same time acts as a barrier against free transmission of heat upwardly by tending to blanket the heat directly above the burner.

The reflector shield is provided with a plurality of apertures which permit the transmission of some of the heat from the burner to the griddle and also the escape of the burned gases that might otherwise smother the flame. The number and size of the apertures in the reflector shield are fixed to allow a predetermined proportion of the total heat from the burner to reach the griddle. Other factors affecting the distribution of heat between the broiler and griddle, such as the position of the reflector shield and the burner relative to each other and to the broiler and griddle, may be kept reasonably constant by means of suitable spacers. The spacers are provided with insulated locking means to hold the reflector in place while permitting expansion and contraction of the reflector. The proper distribution of heat from the burner between the broiler and the griddle makes it possible to use the broiler and griddle simultaneously in an efficient manner.

Another important advantage of the present invention is the saving in gas consumption brought about by the action of the reflector shield in blanketing the heat above the broiler. By directing most of the heat from the burner downwardly towards the broiler, the reflector shield reduces the amount of heat which would otherwise escape around the edges of the griddle or would be transmitted to parts of the range adjacent the broiler or the griddle. Thus in accordance with the present invention a minimum of the heat supplied to the broiler is wasted and surrounding articles are not injuriously affected by such heat as may be wasted.

The structure by which the above advantages are attained will be described in the following specification, taken in conjunction with the accompanying drawings, in which:

Figure 1 is a fragmentary perspective view of a gas range embodying the invention, showing the position of the combination broiler and griddle relative to the rest of the range structure;

Fig. 2 is a longitudinal sectional view, taken along the line 2—2 of Fig. 1, showing the relative positions of the boiler, burner and reflector shield when the griddle is in the position it occupies when in use;

Fig. 3 is a cross sectional view, taken along the line 3—3 of Fig. 2;

Fig. 4 is a plan view, taken generally along the line 4—4 of Fig. 2, with parts of the griddle and reflector shield broken away to facilitate illustration of the structure;

Fig. 5 is a fragmentary side elevation, taken through the broiler box, showing the griddle, burner and reflector shield in raised position;

Fig. 6 is a detail sectional view, showing the means for spacing the reflector shield from the griddle; and Fig. 7 is a detail perspective view of the reflector shield.

In the drawings, the reference numeral 2 indicates a gas range provided with a broiler box 3 having an open top registering with an opening in the top surface of the range. Broiler box 3 comprises side walls 4 and 5, end walls 6 and 7, and a bottom wall 8. End wall 6 is provided with a flue opening 6' for the escape of burned gases. Suitable insulation may be provided around the sides and bottom of broiler box 3 to minimize the loss of heat by transmission through its walls to the surrounding area. A broiler pan 9 is removably supported on a pair of yokes 10 having their ends pivotally mounted in side walls 4 and 5, as indicated at 11.

A griddle 12 fitting over the opening in the top surface of the range serves as a closure for the open top of broiler box 3. As shown in Figs. 2, 4 and 5, a burner 13, which supports the griddle, is rotatably mounted within the broiler box, as by a stub shaft 14 and an arm 15 integral with the burner. One end of shaft 14 is rigidly secured to arm 15 and the free end of the shaft is rotatably supported by side wall 4. Arm 15 is hollow and is in communication with the interior of the burner and a source of gas supply. Arm 15 extends rearwardly from the burner and then laterally to side wall 5 in which the free end of the arm is rotatably supported. Brackets, indicated at 14', may be provided on side walls 4 and 5 to give added support to the rotatable burner mounting.

A pair of lugs 16 projecting upwardly from the top of burner 13 adjacent the end opposite arm 15 support a rod 17 therebetween. Rod 17 is spaced above the top of burner 13 so that it may be engaged by a finger 18 depending from the under side of griddle 12.

The interengagement of finger 18 and rod 17 causes burner 13 and griddle 12 to act as a unit when shaft 14 and arm 15 are rotated. The end of burner 13 remote from arm 15 is raised, and griddle 12 is raised with the burner, to provide access to broiler pan 9. Preferably yokes 10 are connected by a suitable linkage (not shown) to shaft 14 so that when the griddle and burner are raised, as shown in Fig. 5, broiler pan 9 is also raised to bring it close to the top of broiler box 3 and thereby made more readily accessible. Griddle 12 may be separated from burner 13 quickly and readily by sliding it laterally (as viewed in Fig. 2) to disengage finger 18 from rod 17.

Burner 13 is provided with a plurality of bosses 19 projecting upwardly from the top surface of the burner, as shown in Fig. 6. Each boss 19 is provided with a threaded recess 20 extending vertically from its top surface. A reflector shield 21 is positioned on bosses 19 and is spaced from burner 13 by the bosses. An aperture 22, larger than aperture 20, is provided in the reflector shield in registration with each aperture 20. The difference in the size of apertures 22 and 20 is designed to provide reflector shield 21 with clearance around each of a plurality of screws 23 which are threaded into apertures 20. The heads of screws 23 engage the undersurface of griddle 12 to keep all parts of it spaced uniformly above burner 13.

An inverted cup shaped member 24 filled with insulating material 25, such as asbestos, for example, is positioned above each aperture 22 and is held against reflector shield 21 by means of a nut 26 threaded on screw 23. Nuts 26 insure that reflector shield 21 will be maintained properly spaced from griddle 12. The insulating material 25 allows slippage of the reflector relative to the burner, without buckling, during expansion and contraction of the reflector. The reflector shield is so close to burner 13 that it is subjected to considerable heat when burner 13 is lighted. The clearance provided by apertures 22 around screws 23 protects the reflector shield from excessive strain to which it would otherwise be subjected by the expansion and contraction incidental to the rapid heating and cooling of the reflector shield whenever burner 13 is lighted or turned off.

Reflector shield 21 is made of metal, suitably a tarnish resistant metal, such as stainless steel, for example, so as to confine the flame and provide maximum reflection of heat. The reflector shield is shaped so as to cover the top of burner 13 and extend beyond the burner approximately two inches in each direction. A cut out 27 is provided in the surface of reflector shield 21 to fit around lugs 16 and rod 17 and to provide sufficient clearance so that finger 18 may be readily engaged with or disengaged from rod 17.

The edges 28 of reflector shield 21 are curved downwardly to form an inverted disk which serves as a pocket for the convected heat and reflects the radiant heat downwardly over the entire broiler surface. Apertures 29 of sufficient number and size are provided in the top of the reflector shield to allow a predetermined proportion of the heat from burner 13 to rise upwardly readily to heat griddle 12. The total cross section area of apertures 29 is such that when burner 13 is heating broiler pan 9 within the proper range of temperature for efficient broiling, enough heat will rise up through apertures 29 to heat griddle 12 to proper temperature for its use. Apertures 29 also permit the escape of burned gases which might otherwise smother the flame.

Another factor in the proper heating of griddle 12 is the distance intervening between burner 13 and the griddle. This distance may be controlled by screws 23 upon the heads of which griddle 12 rests. The main purpose of these screws, however, is to provide a support for the griddle so that it will not sag under the influence of heat. Finger 18, which is engaged around rod 17, actually spaces one end of the griddle from burner 13. The opposite end of griddle 12 has a boss 30 which engages a plate 31 projecting from arm 15 and integral therewith, and thereby spaces the other end of the griddle from the burner.

From the foregoing description it will be seen that the reflector shield increases the efficiency of a combination broiler and griddle in several ways. The shape of the reflector shield concentrates the flame and the major portion of the heat from the burner around the broiler pan, where it is required, and allows only a controlled small proportion of the heat to be directed against the griddle so that the griddle may be used simultaneously with the broiler without waste of heat. The reflector shield also blankets the heat around the broiler pan. In consequence, less gas is consumed in heating the broiler pan because the heat that is directed to the broiler pan is not immediately dissipated.

While I have described a preferred embodiment of my invention in considerable detail, it will be understood that the description is intended to be illustrative, rather than restrictive, as many details may be modified or changed without departing from the spirit or scope of the invention. Accordingly, I do not desire to be limited to the exact structure described.

I claim:

1. In combination with a broiler, a gas burner positioned adjacent the top of said broiler, a griddle positioned above said burner, a plurality of spacing elements extending upwardly from said burner into engagement with the underside of said griddle, and a reflector shield fixed between said burner and said griddle in predetermined spaced relationship, said shield overlying and surrounding said burner and being apertured to distribute the heat directed towards it by said burner in predetermined proportions between said broiler and said griddle, each edge of said reflector shield being turned downwardly to prevent escape of heat around the edges of said reflector shield.

2. In combination with a broiler, a gas burner positioned adjacent the top of said broiler, a griddle positioned above said burner, a reflector shield fixed between said burner and said griddle in predetermined spaced relationship, said shield overlying and surrounding said burner and being apertured to distribute the heat directed towards it by said burner in predetermined proportions between said broiler and said griddle, and means for adjusting the vertical position of said griddle relative to said reflector shield to facilitate control of the quantity of heat applied to said griddle while said broiler is being heated.

JOHN E. CHAMBERS.

References Cited in the file of this patent

UNITED STATES PATENTS

| Number | Name | Date |
|---|---|---|
| 461,953 | Edmonds | Oct. 27, 1891 |
| 824,477 | Gandar | June 26, 1906 |
| 1,715,617 | Parker | June 4, 1929 |
| 2,011,848 | Chambers | Aug. 20, 1935 |
| 2,164,079 | Parker | June 27, 1939 |
| 2,205,435 | Raber | June 25, 1940 |
| 2,235,886 | Kahn | Mar. 25, 1941 |
| 2,430,848 | Schneider | Nov. 11, 1947 |